United States Patent
Dantzig et al.

(10) Patent No.: US 10,901,790 B2
(45) Date of Patent: Jan. 26, 2021

(54) METHODS AND SYSTEMS FOR COORDINATED TRANSACTIONS IN DISTRIBUTED AND PARALLEL ENVIRONMENTS

(71) Applicant: International Business Machines Corporation, Armonk, NY (US)

(72) Inventors: Paul M. Dantzig, Scarsdale, NY (US); Arun Kwangil Iyengar, Yorktown Heights, NY (US); Francis Nicholas Parr, New York, NY (US); Gong Su, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 145 days.

(21) Appl. No.: 16/129,961

(22) Filed: Sep. 13, 2018

(65) Prior Publication Data

US 2019/0012205 A1      Jan. 10, 2019

Related U.S. Application Data

(60) Continuation of application No. 14/150,179, filed on Jan. 8, 2014, now Pat. No. 10,140,156, which is a
(Continued)

(51) Int. Cl.
*G06F 9/50* (2006.01)
*G06Q 40/04* (2012.01)

(52) U.S. Cl.
CPC .......... *G06F 9/5027* (2013.01); *G06F 9/5044* (2013.01); *G06Q 40/04* (2013.01)

(58) Field of Classification Search
CPC ...... G06F 9/5027; G06F 9/5044; G06Q 40/04
See application file for complete search history.

(56) References Cited

U.S. PATENT DOCUMENTS

| 4,736,318 A | 4/1988 | Delyani et al. |
| 5,247,694 A | 9/1993 | Dahl |
| (Continued) | | |

OTHER PUBLICATIONS

Chicago Mercantile Exchange, "Chapter 5: Trading Qualifications and Practices," CME Rulebook, Oct. 25, 2007, 73 pages.
(Continued)

*Primary Examiner* — Duy Khuong T Nguyen
*Assistant Examiner* — Kevin X Lu
(74) *Attorney, Agent, or Firm* — Kurt Goudy; Ryan, Mason & Lewis, LLP

(57) ABSTRACT

Automated techniques are disclosed for minimizing communication between nodes in a system comprising multiple nodes for executing requests in which a request type is associated with a particular node. For example, a technique comprises the following steps. Information is maintained about frequencies of compound requests received and individual requests comprising the compound requests. For a plurality of request types which frequently occur in a compound request, the plurality of request types is associated to a same node. As another example, a technique for minimizing communication between nodes, in a system comprising multiple nodes for executing a plurality of applications, comprises the steps of maintaining information about an amount of communication between said applications, and using said information to place said applications on said nodes to minimize communication among said nodes.

14 Claims, 14 Drawing Sheets

```
1.  AT GATEWAY
     •  SPLIT X INTO SEPARATE LEG REQUESTS WITH CROSS REF
     •  SELECT PRIMARY = LESSLIKELY TO EXECUTE IMMEDIATELY USING HEURISTIC
     •  SELECTION OF PRIMARY WILL NOT AFFECT OUTCOME

2.  AT SECONDARY BOOK WHEN LEG REACHES HEAD OF PROCESSING QUEUE - PUT IN BAG
     •  BAG AVAILABLE FOR SECONDARY LEG PROCESSING ONLY
     •  AT MOST ONE LEG "WAITING ON BOOK" AT ANY TIME

3.  AT PRIMARY (A) PROCESS LEG AGAINST BOOK A
     •  IF NO MATCH LEAVE ON BOOK FOR SUBSEQUENT MATCH
     •  IF MATCH →
         •  HOLD bookA = LEG1 "AVAILABLE TO EXECUTE"
         •  INTERACT WITH BOOK B VIA XCF NEXT REQUEST 4.  AT SECONDARY BOOK B - SECONDARY LEG FOR MULTILEG X
     •  FETCH SECONDARY LEG FOR X FROM BAG
     •  MATCH AGAINST BOOK B
     •  IF MATCH RETURN SIGNALS THROUGH XCF TO BOOK A COMPLETED
         •  BOTH BOOKS RECORD BOTH LEG EXECUTIONS
     •  IF NO MATCH INVERT - BOOK B LEG WAITING ON BOOK - A LEG INTO BAG AT A
     •  IF B LEG NOT AVAILABLE FROM BAG INVERT AND MARK B LEG INVERT ON ARRIVAL
```

Related U.S. Application Data division of application No. 11/830,199, filed on Jul. 30, 2007, now Pat. No. 8,959,516.

(56) References Cited

U.S. PATENT DOCUMENTS

| | | | |
|---|---|---|---|
| 5,937,393 A | 8/1999 | O'Leary et al. | |
| 6,101,527 A | 8/2000 | Lejeune et al. | |
| 6,105,053 A | 8/2000 | Kimmel et al. | |
| 6,148,324 A * | 11/2000 | Ransom | G06F 9/5083 718/103 |
| 6,397,191 B1 | 5/2002 | Notani et al. | |
| 6,502,051 B1 | 12/2002 | Coyle | |
| 7,069,560 B1 * | 6/2006 | Cheyer | G06F 9/465 719/317 |
| 7,137,033 B2 | 11/2006 | Fifer et al. | |
| 7,167,969 B2 | 1/2007 | Griffin et al. | |
| 7,293,092 B2 | 11/2007 | Sukegawa | |
| 7,302,679 B2 | 11/2007 | Chakrabarti et al. | |
| 7,370,326 B2 * | 5/2008 | Jones | G06F 9/4881 709/238 |
| 7,406,443 B1 | 7/2008 | Fink et al. | |
| 7,469,219 B2 | 12/2008 | Goldberg | |
| 7,571,436 B2 * | 8/2009 | Yoshida | G06F 9/44521 717/162 |
| 7,590,595 B2 | 9/2009 | Pessin | |
| 7,680,151 B2 | 3/2010 | Dougall et al. | |
| 7,712,096 B2 | 5/2010 | Kaczynski et al. | |
| 7,747,493 B1 * | 6/2010 | Monroe | G06Q 30/00 705/35 |
| 7,761,365 B2 | 7/2010 | Kessler et al. | |
| 7,805,360 B2 | 9/2010 | Sundaram et al. | |
| 7,835,975 B1 | 11/2010 | Keith | |
| 7,844,536 B1 | 11/2010 | Andrews et al. | |
| 7,848,994 B1 | 12/2010 | Andrews et al. | |
| 8,010,969 B2 | 8/2011 | Hankins et al. | |
| 8,015,052 B2 | 9/2011 | Woehler | |
| 8,090,643 B2 | 1/2012 | Neyman et al. | |
| 8,117,288 B2 | 2/2012 | Bhanot et al. | |
| 8,898,669 B2 | 11/2014 | Dantzig et al. | |
| 2001/0044770 A1 | 11/2001 | Keith | |
| 2002/0107781 A1 | 8/2002 | Neyman et al. | |
| 2002/0128919 A1 | 9/2002 | Rime et al. | |
| 2002/0143598 A1 | 10/2002 | Scheer | |
| 2003/0033180 A1 | 2/2003 | Shekar et al. | |
| 2003/0088608 A1 | 5/2003 | McDonald | |
| 2003/0135724 A1 | 7/2003 | Krishnamurthy et al. | |
| 2004/0098718 A1 | 5/2004 | Yoshii et al. | |
| 2004/0167824 A1 | 8/2004 | Singh et al. | |
| 2004/0267655 A1 | 12/2004 | Davidowitz et al. | |
| 2005/0075955 A1 | 4/2005 | Milovina-Meyer et al. | |
| 2005/0108102 A1 | 5/2005 | York | |
| 2005/0125329 A1 | 6/2005 | Gerhart et al. | |
| 2005/0132252 A1 | 6/2005 | Fifer et al. | |
| 2005/0144160 A1 | 6/2005 | Doerre et al. | |
| 2005/0149428 A1 | 7/2005 | Gooch et al. | |
| 2006/0015588 A1 | 1/2006 | Achlioptas et al. | |
| 2006/0101104 A1 | 5/2006 | Bhanot et al. | |
| 2006/0107268 A1 * | 5/2006 | Chrabieh | G06F 9/4881 718/100 |
| 2006/0218071 A1 | 9/2006 | Sweeting | |
| 2007/0005487 A1 * | 1/2007 | Keith | G06Q 40/00 705/37 |
| 2007/0016574 A1 | 1/2007 | Carmel et al. | |
| 2007/0055607 A1 | 3/2007 | Wunsch et al. | |
| 2007/0110094 A1 | 5/2007 | Tobita et al. | |
| 2007/0276715 A1 | 11/2007 | Beringer et al. | |
| 2007/0299731 A1 | 12/2007 | Erickson et al. | |
| 2008/0040256 A1 | 2/2008 | Neyman et al. | |
| 2008/0126833 A1 * | 5/2008 | Callaway | G06F 11/1446 714/6.1 |
| 2009/0276348 A1 | 11/2009 | Kessler et al. | |
| 2010/0185718 A1 | 7/2010 | Archer et al. | |
| 2011/0202518 A1 | 8/2011 | Maedera et al. | |
| 2012/0066474 A1 * | 3/2012 | Funk | G06F 12/1027 711/207 |

OTHER PUBLICATIONS

Wikipedia, "Two-Phase Commit Protocol," http://en.wikipedia.org/wiki/Two-phase_commit, Oct. 31, 2007, 4 pages.

G. Karypis et al., "A Fast and High Quality Multilevel Scheme for Partitioning Irregular Graphs," SIAM Journal on Scientific Computing, 1999, pp. 359-392, vol. 20, No. 1.

G. Cheng et al., "Developing Interactive PVM-Based Parallel Programs on Distributed Computing Systems with AVS Framework," Syracuse University, Northeast Parallel Architecture Center, Paper 36, 1994, 9 pages.

Unknown Author, "IBM Research—Zurich I News I," Aug. 11, 2005, 2 pages.

Y. Nevmyvaka et al., "Reinforcement Learning for Optimized Trade Execution," Proceedings of the 23rd International Conference on Machine Learning (ICML), Jun. 25-29, 2006, pp. 673-680.

* cited by examiner

FIG. 7A

1. AT GATEWAY
   - SPLIT X INTO SEPARATE LEG REQUESTS WITH CROSS REF
   - SELECT PRIMARY = LESSLIKELY TO EXECUTE IMMEDIATELY USING HEURISTIC
   - SELECTION OF PRIMARY WILL NOT AFFECT OUTCOME

2. AT SECONDARY BOOK WHEN LEG REACHES HEAD OF PROCESSING QUEUE – PUT IN BAG
   - BAG AVAILABLE FOR SECONDARY LEG PROCESSING ONLY
   - AT MOST ONE LEG "WAITING ON BOOK" AT ANY TIME

3. AT PRIMARY (A) PROCESS LEG AGAINST BOOK A
   - IF NO MATCH LEAVE ON BOOK FOR SUBSEQUENT MATCH
   - IF MATCH →
     - HOLD bookA = LEG1 "AVAILABLE TO EXECUTE"
     - INTERACT WITH BOOK B VIA XCF NEXT REQUEST 4. AT SECONDARY BOOK B – SECONDARY LEG FOR MULTILEG X
   - FETCH SECONDARY LEG FOR X FROM BAG
   - MATCH AGAINST BOOK B
   - IF MATCH RETURN SIGNALS THROUGH XCF TO BOOK A COMPLETED
     - BOTH BOOKS RECORD BOTH LEG EXECUTIONS
   - IF NO MATCH INVERT – BOOK B LEG WAITING ON BOOK – A LEG INTO BAG AT A
   - IF B LEG NOT AVAILABLE FROM BAG INVERT AND MARK B LEG INVERT ON ARRIVAL

*FIG. 7B*

5. HISTORY MANAGEMENT
   * MULTILEG CAN NOT BE TREATED AS "SAFE" UNTIL BOTH BOOKS HAVE HARDENED
   * HISTORY RECORDERS COORDINATE - REPORT <LOGGED THRU, CONFIRMED THRU>
   * HISTORY RECORDERS TRACK AND LOOK FOR MULTILEG HARDENING PROGRESS FROM OTHER BOOKS

6. SEQUENCING MUST NOT BE ARBITRARY ON FAILOVER IN PRESENCE OF MULTILEGS
   * PEER-PEER WITH XCF GIVES EXACTLY THAT
   * ON FAILURE - *ALL* COMPLETED TRANSACTIONS REPEATED

7. CROSS LOGGING AND FAST BOOK TO BOOK PROVIDE A NON XCF SOLUTION
   * DISCLOSURE IS STRUCTURED:
     * GENERIC MULTILEG CONCEPT,
     * MULTILEG WITH XCF, SIMPLER RECOVERY PEER COORDINATION,
     * IN NON XCF ENVIRONMENT - ON NODE FAILURE, SEQUENCING THROUGH LAST MULTILEG INTERACTION WHICH GOT RECORDED ON SOME NON FAILING SITE IS RECOVERED

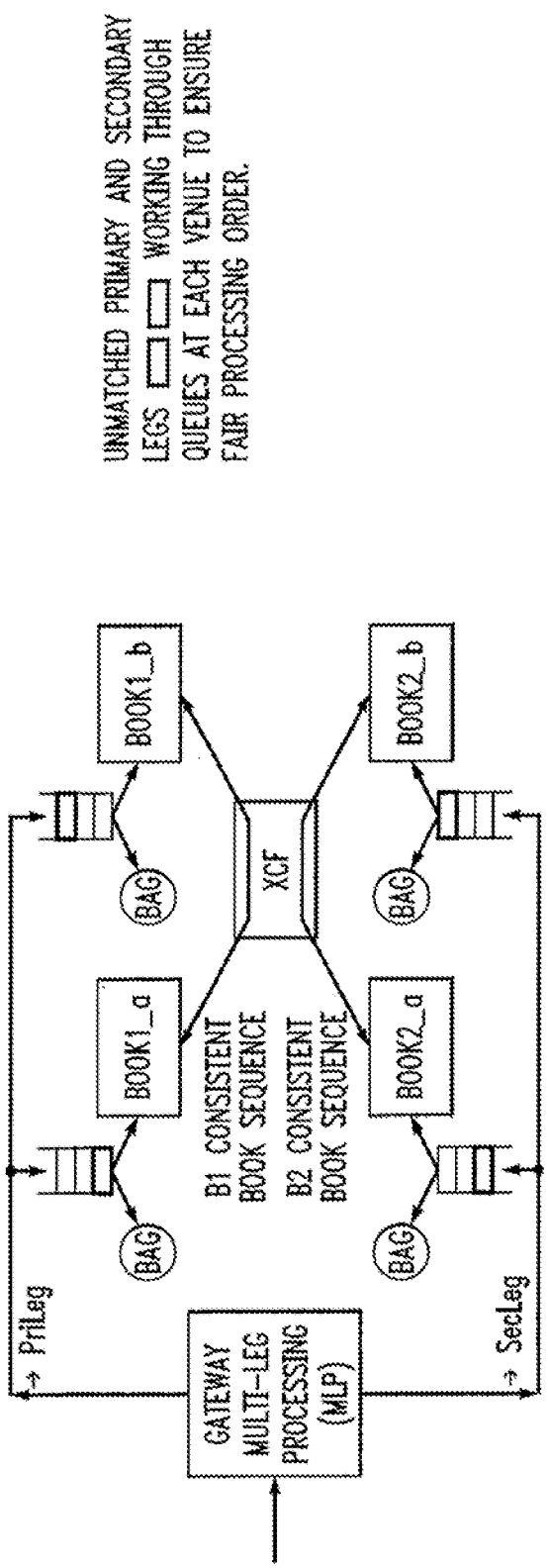
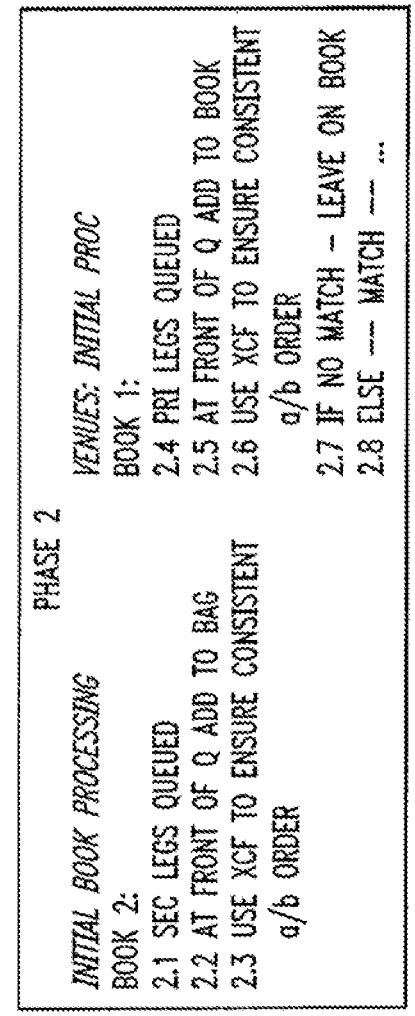
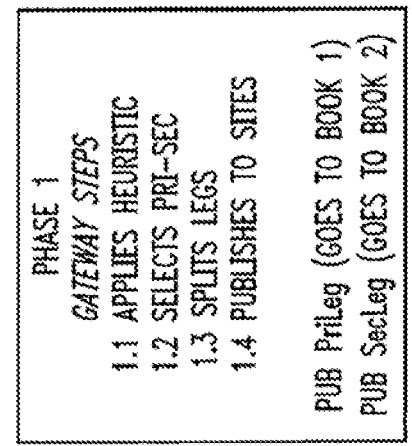
FIG. 9

METHODS AND SYSTEMS FOR COORDINATED TRANSACTIONS IN DISTRIBUTED AND PARALLEL ENVIRONMENTS

CROSS-REFERENCE TO RELATED APPLICATIONS

This application is a Continuation of U.S. patent application Ser. No. 14/150,179, filed on Jan. 8, 2014, now U.S. Pat. No. 10,140,156, which is a Divisional of U.S. patent application Ser. No. 11/830,199, filed on Jul. 30, 2007, now U.S. Pat. No. 8,959,516. This application is related to U.S. application Ser. No. 11/830,195, filed on Jul. 30, 2007, which is now U.S. Pat. No. 8,898,669, the disclosure of which is incorporated by reference herein.

FIELD OF THE INVENTION

The present application relates to data processing systems and, more particularly, to techniques for transaction or request processing in such data processing systems.

BACKGROUND OF THE INVENTION

Market matching engines are data processing systems that process high rates of requests or transactions (also referred to herein as transaction processing systems), and are used by financial companies to trade items such as stocks and other commodities. Clients enter orders to either buy or sell an amount of an item. Scaling market matching engines to handle high request rates within guaranteed response times is critically important. High availability is also essential.

In the simplest case, a client will issue an order to buy or sell a fixed amount of an item. More complicated orders may include so-called "multiple leg" or "multileg" trades, in which an order includes multiple items to buy or sell and where there may be correlations and dependencies between different parts of the same order. Thus, a multileg trade is one in which two or more trades are contained in the same request. For example, a client might want to sell 100 shares of company A stock at $88 per share and, in the same order, buy 100 shares of company B stock at $88 per share. If the client can not execute both legs of the multiple leg trade, then the client prefers to execute neither leg.

The concepts behind multileg trading have existed for many years and were initially developed by traders who would notice they could buy commodities such as grains at different prices from various farmers in different towns. This eventually moved to the stock exchange floor where a trader would notice that the exchange rates of Platinum and Gold could have a small amount of price difference so that a profit could be made by selling off a larger quantity of perhaps Gold and buying a smaller quantity of Platinum. The faster the trader and the faster her ability to execute the trade without other traders noticing the arbitrage could mean the difference between making a big profit and getting no profit at all. Handling multileg trades of this nature on open exchange floors has been done by working with other traders. The trader would sell his Gold; as soon he received the hand signal the transaction had completed, he would signal another trader to execute his buy of Platinum.

Most multileg trades would be between two symbols as an example (prices are per ounce): Gold at 653.45 and Platinum at 1292.34. The concept certainly could be extended to three or more items: Dollar to Euro 1.34 and Euro to British Pound 0.6734.

Current stock exchanges do not support electronic multileg trading. As indicated in the previous description, the concepts of signaling to make a trade and make it active would interrupt the standard flow of trades. Some brokerage companies do support the concept, and they determine the rules of how much risk they are willing to take if the sell and buy does not complete or completes with incorrect values. A key problem with current support of multileg transactions is that the level of coordination is insufficient to achieve precise matches in prices requested by clients. As a result, clients have to be willing to tolerate approximate price matches if they are to use multileg trades. Because of this, many customers are not using multileg trading.

Types of trades where multileg support would have significant impact are in the monetary (gold, silver, etc.) and foreign exchange trading (dollar, euro, pound, etc.). Other examples would be in specific stock groupings (technology, biotech, etc.).

There is thus a need to achieve automated multileg trading with greater precision in prices than offered by existing methods.

SUMMARY OF THE INVENTION

Principles of the invention provide automated techniques for coordinating request or transaction processing in a data processing system.

For example, in one aspect of the invention, a technique for handling requests in a data processing system comprises the following steps. A compound request comprising at least two individual requests of different types is received. An individual request r1 of the compound request is placed on a queue for requests of type t1, wherein t1 is the request type of r1. After r1 has reached the front of the queue, it is determined if at least one individual request of said compound request can execute. The compound request is executed if it is determined that all individual requests of the compound request can execute.

In another aspect of the invention, a technique for handling compound requests, in a system comprising multiple nodes for executing requests in which an individual request is associated with a particular node, comprises the following steps. A compound request comprising at least two individual requests associated with a same node is received. It is determined if both of the at least two individual requests are executable. The compound request is executed if it is determined that all individual requests of the compound request can execute.

Further, principles of the invention also provide automated techniques for minimizing communication between nodes in a system comprising multiple nodes for executing requests in which a request type is associated with a particular node.

For example, in such an aspect of the invention, a technique comprises the following steps. Information is maintained about frequencies of compound requests received and individual requests comprising the compound requests. For a plurality of request types which frequently occur in a compound request, the plurality of request types is associated to a same node.

In yet another aspect of the invention, a technique for minimizing communication between nodes, in a system comprising multiple nodes for executing a plurality of applications, comprises the steps of maintaining information about an amount of communication between said applications, and using said information to place said applications on said nodes to minimize communication among said nodes.

While not intended to be limited thereto, the above techniques may preferably be implemented in accordance with market matching engines and financial exchanges.

These and other objects, features and advantages of the present invention will become apparent from the following detailed description of illustrative embodiments thereof, which is to be read in connection with the accompanying drawings.

BRIEF DESCRIPTION OF THE DRAWINGS

FIGS. 7A and 7B show an overview of a multileg trade processing algorithm in accordance with one embodiment of the invention.

FIGS. 8 through 15 show states in a two leg trade example at each major intermediate point according to an embodiment of the invention.

DETAILED DESCRIPTION OF PREFERRED EMBODIMENTS

Figure 1A:
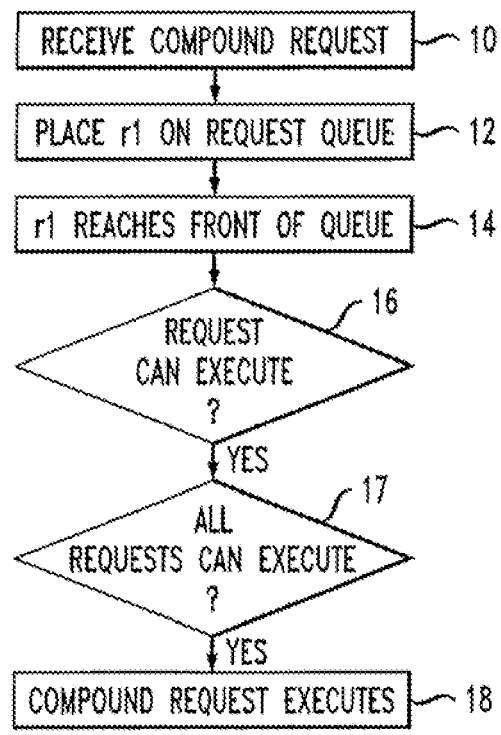
FIG. 1A shows a method for processing compound requests in accordance with one embodiment of the invention.

While certain illustrative embodiments of the invention will be described herein from the perspective of financial transactions, it is to be understood that principles of the invention are not limited to use with any particular application or data processing system. Rather, principles of the invention are more generally applicable to any application and any data processing system in which it would be desirable to provide improved transaction processing.

As mentioned above, a multileg trade typically includes multiple legs each presenting a request to trade in a different instrument. The trade will typically be matched and executed only if all the legs can be matched and executed. Each leg typically executes in a specific valid order/sequence in the book defining trades in that symbol. Multileg trades typically are not reported executed back to the requester until all leg executions have been durably hardened in persistent storage so that state can properly be restored in the event of a failure. For scalability, a system handling multileg trades may consist of many nodes. Trade-matching venues preferably have multiple in memory copies with some fail over scheme and consistent sequencing enforcement between the copies. Trade-matching venues preferably stream matched requests to some set of logging servers, hardening executed trade reports (which allows them to be reconstructed after a failure) in order and indicating high water mark progress in writing these logs back to the execution venues to allow durable (logged) trades to be reported as executed back to the requester.

It is to be appreciated that "processing nodes" or, more simply, "nodes" in a data processing system such as the ones described herein may be logically allocated portions of processing resources (virtual machines) within one computing system, such as a mainframe computer. Alternatively, such processing nodes may be one or more types of computing devices, e.g., server, personal computer, laptop computer, handheld computing device, etc. However, principles of the invention are not limited to any particular type of computing device or computing architecture.

We first describe a general embodiment of our invention for coordinating request processing.

Multileg requests are examples of compound requests. In an illustrative embodiment of the invention, the data processing system either executes all of the individual requests in a compound request or it executes none of the individual requests. In order to execute a request, one or more preconditions must be satisfied. For example, in order to buy 30 shares of IBM stock at $105 per share, the shares must be available at that price on the market. A compound request contains two or more individual requests. The number of individual requests in a compound request may be up to an arbitrarily large number. While there is no limit to the number of individual requests in a compound request, the complexity and time for handling compound requests grows with the number of individual requests contained therein.

Principles of the invention realize that there is often an ordering for processing individual requests. For example, requests for IBM stock may have to be processed in the order in which they are received. These order constraints have to be observed in processing compound requests.

FIG. 1A shows a method for processing requests in accordance with an embodiment of the invention. It is to be appreciated that the methodologies described herein may be performed by one or more data processing systems. Thus, the term "system" mentioned in the context of these methodologies is to be generally understood to refer to one or more data processing systems. Also, the terms "request" and "transaction" may be used interchangeably in the illustrative embodiments described herein.

As shown, in step 10, the system receives a compound request which is a request comprised of a plurality of individual requests. For example, consider an individual request to sell 100 shares of Microsoft stock at $30 per share and another individual request to buy 30 shares of IBM stock at $105 per share. An example of a compound request would be to both sell 100 shares of Microsoft stock at $30 per share and to buy 30 shares of IBM stock at $105 per share. If we had a third individual request to buy 1 share of Google stock at $500 per share, then another compound request would be to sell 100 shares of Microsoft stock at $30 per share, to buy 30 shares of IBM stock at $105 per share, and to buy 1 share of Google stock at $500 per share.

In step 12, one of the individual requests, r1, making up a compound request is placed on a queue of requests for its type. For example, let r1 be a request to sell 100 shares of Microsoft stock at $30 per share. The financial exchange may process requests for a specific stock, in this case Microsoft stock, in the order in which the requests are received. In step 12, r1 would be placed on a queue for Microsoft stock.

In step 14, r1 reaches the front of this queue. At this point in time or shortly afterwards, the system determines in decision step 16 whether r1 can execute (a variation on this embodiment within the spirit and scope of the invention is to instead determine whether at least one of the other requests (not r1) within the compound request can execute). In order for r1 to be executable, some combination of clients must be willing to buy 100 shares of Microsoft stock at $30 per share.

If it is determined in step 16 that r1 can execute, it is determined in step 17 whether the other individual requests within the compound request can execute. For example, a request to buy 30 shares of IBM stock at $105 per share will only be executable if shares at this price are available on the market. If any request is found that can not execute, then step 17 can terminate. Otherwise, if all requests can execute, then processing continues to step 18 which causes the entire compound request to execute.

When the compound request executes in step 18, all of the individual requests within the compound request execute. Step 18 may also write the results of the request execution to persistent storage, in a database management system (DBMS), for example. That way, after a failure, the results of the executed compound request would still be available from the persistent storage. After the request executes, the system might also notify the client that the compound request has executed.

If, in step 16 or step 17, it is determined that at least one individual request can not execute, one option would be for the system to reject the compound request and to execute none of the requests within the compound request. The system could optionally inform a client that the compound request has failed.

Another option in response to a negative determination from step 16 or 17 would be for the system to periodically re-determine whether it may be possible for all of the individual requests to execute and if this determination is eventually affirmative, executing the compound request.

Another option in response to a negative determination from step 16 or 17 would be for the system to only execute a subset of requests in the compound request for which each request in the subset can actually execute. The system could then inform a client of which requests have executed.

In this example, r1 can play a key role in determining whether to continue trying to satisfy the compound request. In step 16, the system can make a decision of whether to proceed with trying to satisfy the compound request based on whether r1 can execute. In order to minimize the number of individual transactions that need to be tested to reject a compound request which cannot be satisfied, one approach is to pick r1 in step 12 because it has a relatively low probability of being executable.

Each of the individual requests might have ordering constraints, not just r1. For example, requests to buy or sell IBM stock might have to be processed in the order in which they are received. Similarly, requests to buy or sell Google stock might have to be processed in the order in which they were received. Microsoft, IBM, and Google stocks might each have their own queues for ordering requests.

Therefore, a variation within the spirit and scope of this invention is to place one or more requests of the compound request, in addition to r1, on a queue corresponding to its request type. The system would then determine if the individual requests are executable only after the plurality of requests have reached the front of their respective queues. That way, no request corresponding to the compound request placed on a queue would be executed before an earlier request of the same type was received and placed on the same queue.

One option is to place all individual requests comprising the compound request on queues and wait for them to reach the front of their respective queues before seeing if they are executable.

As before, let r1 be a request to sell 100 shares of Microsoft stock at $30 per share. Just because r1 can execute at one point in time does not mean that it will be able to execute later. For example, Microsoft stock could be selling at $30 per share and the price could then drop to $25 per share.

In some (but not all) environments, it may be possible to reserve some resources to allow an executable individual request to continue to be executable for sometime into the future. If, in the meantime, the other individual requests become executable, then the entire compound request can execute. If it turns out that at least one other individual request is not executable, then the system may be able to release the resources reserved for the executable individual request and reject the compound request.

We now describe another embodiment of the invention in the context of a highly available system for financial exchanges. The following background information is important for understanding this embodiment.

Market matching is a core component needed to manage trading in a set of financial instruments. A market matching service typically maintains a set of order books. Different order books may be maintained for different financial instruments traded. The order books may be used for processing arriving orders to buy and sell those instruments. Requests arriving at the market matching service may be a mixture of new orders, cancellations and modifications of previous orders, etc. A simple order is a request to buy or sell a specific quantity of a specific instrument on behalf of a specific customer at a named price or limit price. Refinements such as mass-quote, stop loss and all-or-nothing orders require additional features but do not change the basic pattern of processing.

Within the market matching function, arriving orders may be added sequentially into an order book for an instrument it refers to. A market matching engine should then identify and execute one or more orders which can be traded immediately. It does this by matching a newly arrived order with other matching orders already in the book for that instrument. Orders to sell are matched with orders to buy for the same instrument at the same price and conversely.

Published business rules govern how this matching of orders is to be done. For example, orders might have to be processed fairly and in the sequence in which they are received. Orders might always have to be satisfied at the best matching price available and for as much of the quantity specified in the arriving order as is possible at that price and time. If there is a choice of matching orders at the best price, published allocation rules may govern which matching orders will be selected for trading.

A market matching function may also be responsible for generating acknowledgements when it has processed an order, reporting on successfully applying an order to the market book and on trades executed involving that order. A gateway function is to return these acknowledgements to the customer. The market matching function may also be responsible for generating and distributing market information describing the current market liquidity and recently executed trades anonymously.

Customers may interact with a market matching function of an exchange through sessions with a set of gateways—we also use the term gateway processing nodes. The gateways may handle the communication and client session processing for an individual client's electronic connection to the exchange. One client may be interacting with multiple trading products in an exchange and with multiple order books within each trading product. The gateway processing may be responsible for forwarding orders from customers to an appropriate market matching function and getting acknowledgements from the market matching function delivered back to the customer.

Since reliability may be a critical requirement on the market matching function, market matching processing may be organized so as to have secondary market matching capability prepared and ready to take over processing responsibility from primary market matching capability in the event of a market matching engine failure.

An electronic market matching engine may operate in a continuous loop executing a sequence of logical steps for received requests similar to the following:
  Buy and sell orders are received for parsing, matching, and sequencing (they may have already been assigned conversation sequence numbers to ensure that the messages for each customer conversation are handled in the correct order, but now primary node sequencing numbers are added to fix the ordering between requests from different customers and to enable standby and failover processing by a secondary).
  Order cancellations and modifications are applied to orders in the book.
  New orders are placed in the book and logged to ensure recovery over a system failure.
  The matching engine determines whether a newly arrived or modified order is tradable immediately because there are previous opposing orders in the book matching the newly arrived or modified order.
  An allocation algorithm is run to determine the exact orders to trade following precisely defined business rules.
  All successfully completed and logged actions including order placement, and completed trades are acknowledged back to the trading or requesting customers via gate processing; anonymized reports on executed trades and market liquidity are also published as market data.
  The logged orders and trades are streamed into a database where they may be available to surveillance queries by, for example, control center staff.

In addition, a market matching system may provide operator facilities to start, stop, pause and monitor markets (sets of books). It may also provide facilities to allow operators to locate books within the matching engine and orders of a particular customer, and process them individually, or make manual corrections.

Figure 1B:
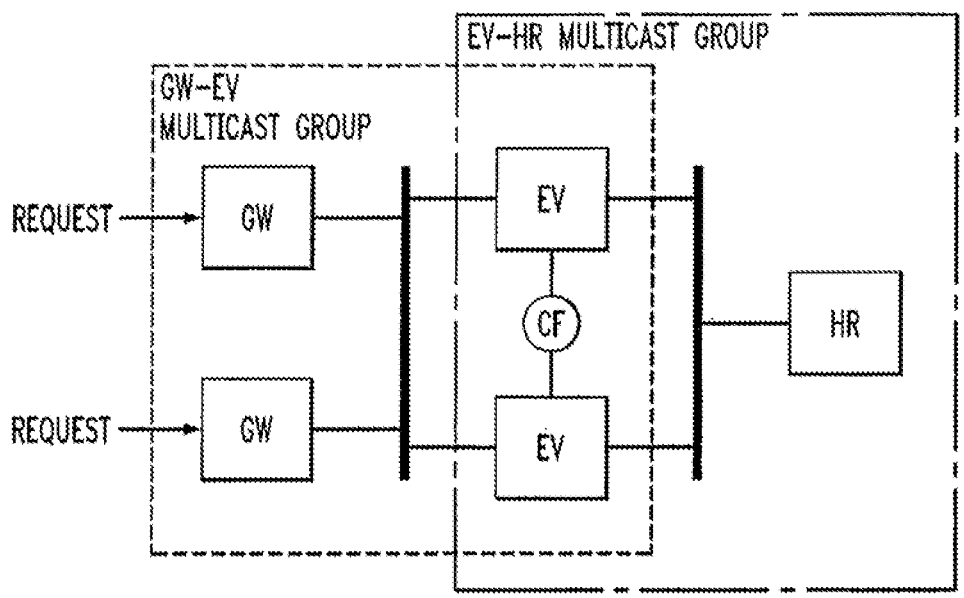
FIG. 1B shows a system for processing compound requests in accordance with one embodiment of the invention.

FIG. 1B shows a system for handling requests in accordance with an illustrative embodiment of the invention. Requests come into at least one gateway (GW) node and are then sent to execution venues (EV). The two EVs in the figure may be on separate nodes and thus might not share memory. The coupling facility (CF) provides shared memory for the two EV's in the figure to use to share information. IBM Corporation's XCF is an example of a coupling facility. Other forms of shared memory can also be used for the CF within the spirit and scope of the invention.

HR is a history recorder which would typically have persistent storage (e.g., database, file system, etc.) which the system could use to store information persistently.

In order to satisfy high request rates, it is necessary to use multiple nodes in which different requests may be routed to different nodes. Multiple nodes would be different computers which do not necessarily share a memory. This will achieve much better performance than using a single node for handling requests. In previous examples using execution venues (EV), this would correspond to a scenario in which multiple execution venues are used, not just for high availability but for handling higher request rates as well.

In financial transactions, state information corresponding to buy and sell orders may be referred to as order book state. If IBM, Microsoft, and Google stock are being traded, then a separate order book containing buy and sell orders may exist for each of these stocks.

Figure 2:
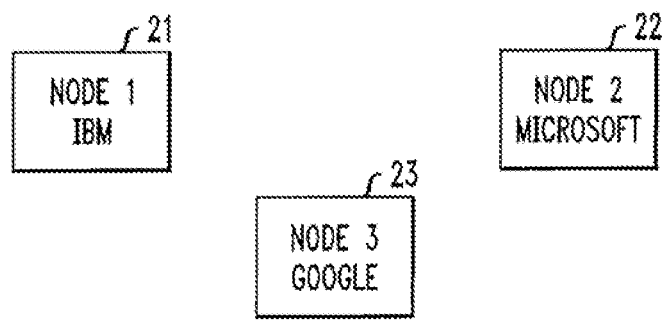
FIG. 2 shows a method for partitioning order books across in accordance with one embodiment of the invention.

In FIG. 2, it is shown that order books for IBM, Microsoft, and Google all reside on different nodes. Requests for IBM stock will be handled by node 1 (21), requests for Microsoft stock will be handled by node 2 (22), and requests for Google stock will be handled by node 3 (23). A compound order containing individual orders for both IBM stock and Google stock will require contacting both node 1 and node 3. A compound order containing individual orders for IBM, Microsoft, and Google stock will require contacting all three nodes. It is preferable to contact as few nodes as possible in handling a request because communication between nodes adds overhead.

Figure 3:
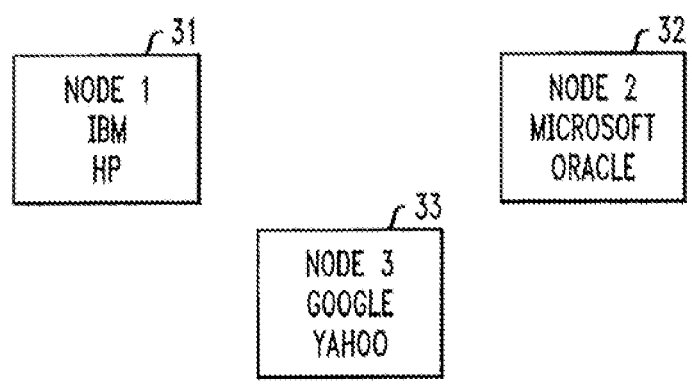
FIG. 3 shows another method for partitioning order books across nodes in accordance with one embodiment of the invention.

In FIG. 3, requests for IBM and Hewlett Packard (HP) would go to node 1 (31), requests for Microsoft and Oracle would go to node 2 (32), and requests for Google and Yahoo would go to node 3 (33). If compound orders pairing individual orders from IBM and HP, Microsoft and Oracle, as well as Google and Yahoo are common, then this partitioning of the order books is good, as it would minimize internode communication for compound orders. If, on the other hand, it is much more common to see compound orders involving IBM and Microsoft, then this partitioning of order books will not minimize internode communication for this type of compound order. A different partitioning which places the order books for both IBM and Microsoft on the same node would thus be preferable.

Thus, it should be clear that minimizing communication between nodes for handling compound requests is important for performance.

Figure 4:
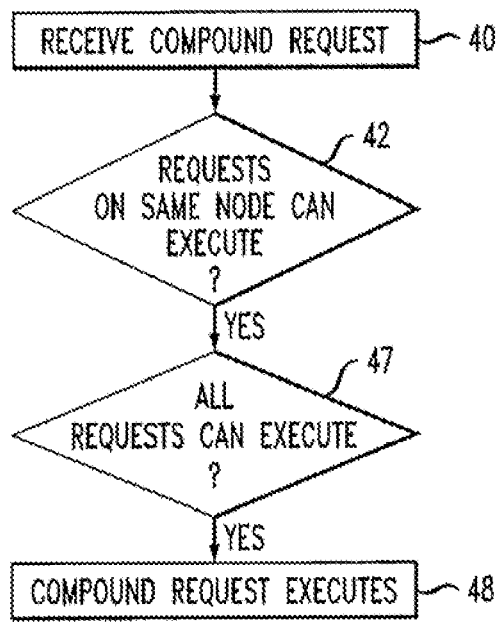
FIG. 4 shows a method for efficiently processing compound requests in a multiple node environment in accordance with one embodiment of the invention.

FIG. 4 shows a method for minimizing communication between nodes for handling compound requests. In step 40, the system receives a compound request. The system determines whether any individual requests of the compound request would be processed on a same node. For example, in the system shown in FIG. 3, a compound request comprised of individual requests for IBM, HP, and Google would process the requests for IBM and HP on node 1.

In step 42, the system determines if the individual requests which would execute on the same node (requests for IBM and HP in the example) are executable. As soon as the system finds an individual request which is not executable, one option is to reject the compound request. Another option is to see if the individual request becomes executable at some point in the future. The key advantage to this approach is that one is handling both the IBM and HP requests without extraneous communication to a remote node.

If it turns out that all individual requests on the same node are executable, the system determines whether the other individual request(s) comprising the compound request are executable in step 47. If all individual requests are executable, then the compound request may execute in step 48. If all individual requests are not found to be executable in step 47, then the system could reject the compound request. Alternatively, the system could determine if an unexecutable request becomes executable in the future. Note that step 47 does not always require that all requests be tested for executability. If any request is found to be unexecutable in step 47, then it is not necessary to keep testing remaining requests for executability.

Figure 5:
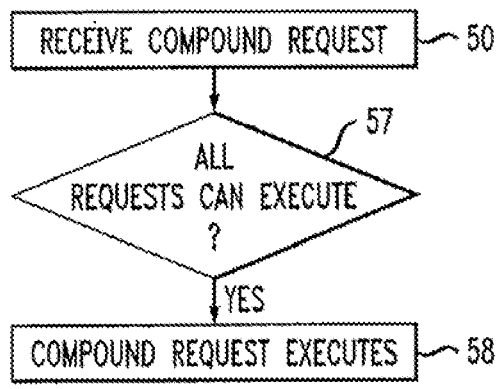
FIG. 5 shows a method for efficiently processing compound requests in a multiple node environment in accordance with another embodiment of the invention.

FIG. 5 shows a variation on the method for minimizing communication for handling compound requests. It is particularly applicable when a compound request includes many individual requests. In step 50, the system receives a compound request. In step 57, the system determines if all requests can execute by consulting nodes in an order based on the number of individual requests being handled by the node. It starts out by consulting a node n1 having a greatest number of individual requests (comprising the compound transaction) assigned to it. If the system determines a request which can not execute, it does not have to continue determining the executability of requests; it can, instead, simply reject the compound request.

If the system determines that all requests on node 1 can execute, then it consults the node with a next highest number of individual requests assigned to it and performs a similar procedure. As the system continues to find all examined requests being executable, it consults nodes in decreasing order of individual requests assigned to the node until a request which is not executable is found or all requests have been found to be executable. If it is determined in step 57 that all requests are executable, then the compound request executes in step 58.

In some cases, it will be desirable to assign one or more stocks (or more generally, request types) to a different node in order to minimize communication in compound orders. For example, in FIG. 3, if it is the case that IBM and Microsoft are frequently paired in a same compound order, then it may be desirable to have requests for IBM and Microsoft handled by the same node. This would be accomplished by placing the order books for both IBM and Microsoft on a same node.

Figure 6:
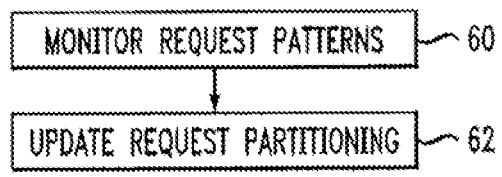
FIG. 6 shows a method for optimizing partitioning of requests across a multiple node system in accordance with one embodiment of the invention.

FIG. 6 depicts a method for updating assignments of stocks (more generally, request types) to nodes in order to reduce communication between nodes. In step 60, requests are monitored. Compound requests received and the individual requests making up the compound requests are noted. Based on the monitoring that is performed in step 60, the system modifies the assignment of stocks to nodes in step 62 to reduce communication. In order to reassign a stock from one node, n1, to another node, n2, the order book for the stock must be transferred from n1 to n2.

A general heuristic that may be applied in step 62 is to group stocks on a same node which typically occur in a same compound request. For example, if requests for IBM stock and requests for Microsoft stock are frequently paired together in a compound request, it would be preferable to process requests for both IBM and Microsoft stock on a same node. Therefore, order books for both IBM and Microsoft stock should be stored on that same node.

One method is as follows. The system determines relative frequencies with which groups of stocks appear in a same compound request. The groups which most frequently appear in a same compound request are preferably assigned to the same node.

An example of this method is as follows. The system determines the relative frequencies with which pairs of stocks appear in a same compound request. Suppose that there are n stocks which can be indexed by stock[1], stock[2], stock[n]. Then f[i,j] represents the relative frequency with which both stock[i] and stock[j] appear in a same compound request. The higher the value of f[i,j], the more frequently stocks i and j appear in a same compound request.

The system assigns stocks to nodes by scanning through f[i,j] in order of decreasing values. It uses information monitored in step 60 to estimate how much request traffic each stock is expected to incur. As stocks are assigned to nodes, the system maintains an estimate of the capacity the node still has despite request traffic to stocks already assigned to the node. The system starts with a highest value of f[i,j]. It scans through values of f[i,j] in decreasing order until a value of 0 is reached. If both stock[i] and stock[j] have already been assigned to nodes, no further assignments are made. If neither stock[i] nor stock[j] has been assigned to a node, both stock[i] and stock[j] are assigned to a node, nh, with a highest amount of estimated capacity not used up provided nh has sufficient capacity; if this assignment would cause the estimated load of nh to exceed a maximum, stock[i] and stock[j] are not assigned to a node until some point in the future. If only one of stock[i] and stock[j] has been assigned to a node n1, the system assigns the other stock to node n1 if and only if doing so would not cause the estimated load of n1 to exceed a maximum. If this assignment would cause the estimated load of n1 to exceed a maximum, the other stock is not assigned to a node until some point in the future.

Scanning through values of f[i,j] in decreasing order continues until either all stocks have been assigned to nodes or a value of f[i,j]=0 is reached. If a value of f[i,j] 0 is reached, the remaining unassigned stocks are assigned to nodes in another fashion. For example, they could be assigned to nodes by scanning through each unassigned stock and assigning it to the node with the highest estimated remaining capacity.

Updating the partitioning of requests in step 62 can be done when the system is offline. For example, the system may be taken offline for maintenance purposes, including optimizing the assignment of stocks to nodes. In another scenario, the markets might shut down at the end of business hours, allowing the assignment of stocks to nodes to be optimized before the markets are next re-opened.

Another option is to dynamically reassign stocks to different nodes while the system is still running. Since the reassignment process incurs overhead and can potentially disrupt normal execution, it is not desirable to perform reassignments too frequently. Instead, the system can monitor the overhead from internode communication due to compound requests. When this overhead gets too large, the system can then move one or more stocks to other nodes to reduce internode communication; this would be done while the system would continue to serve requests.

Note that the methods depicted in FIG. 6 and described above can be applied to other applications besides compound request processing. These methods are broadly applicable to applications running on multi-node systems. Suppose that there are several applications, each running on a particular node of a multi-node system. One application may communicate with another application. For applications which communicate with each other frequently, it is desirable to place them on a same node to minimize communication between nodes. In order to balance load across the nodes, however, applications should be spread across different nodes.

In this scenario, the monitoring techniques corresponding to step 60 in FIG. 6 could be applied to obtain information about how applications communicate with each other. While there may be no concept of compound requests, the system would still have the ability to monitor and record information about communication between the various applications. Techniques corresponding to step 62 could then be applied to assign applications to nodes in order to minimize communication between the nodes. A key criterion would be to place applications which frequently communicate with each other on a same node. Quantities related to the frequency with which stocks appear in a same compound request such as f[i,j] would be replaced by metrics related to the amount with which applications communicate with each other in the more general approach.

We now describe another embodiment in the context of FIGS. 7A through 15.

In the following embodiment, multileg requests correspond to compound requests described in the earlier embodiments.

It is to be appreciated that certain characteristics may be realized in accordance with illustrative principles of the invention. For instance:

At a given point in time, typically only one leg of the multileg trade is being considered for active matching. At a point in time, there are a set of legs of the multileg trade which have been provisionally matched and have appropriate specific trades defined and waiting to see if all legs of the multileg can be matched. There is a "next leg" which is the leg in process for which we are trying to find a match allowing this to be added to the set of provisionally matched legs. There are waiting legs being held outside the books where they are available for matching by incoming market requests. In principle, we do not want to allow more than one "next leg" to be sitting on books available for matching by incoming requests.

The "least likely to trade immediately" leg of the "not yet provisionally matched legs" is the one which should preferably be actively matched or should be sitting in a book available to be actively matched by new incoming requests to trade on its instrument.

An efficient mechanism is provided for a venue which has provisionally matched a leg of a multileg trade to signal to other execution venues of the next-least likely-to-trade-immediately leg, asking them to now actively seek an execution for that leg as their next (high priority). The execution venue (EV) sites can interact with a shared facility such as a coupling facility (CF) to determine the next request to match in a way compatible with peer matching engines for this instrument.

If in processing a non-primary leg of a multileg trade, no match is found, this provides new information on likelihood of immediate tradability: specifically we know that this leg is not immediately executable (and by implication the overall multileg is not immediately executable). Hence, provisionally matched legs should be undone and released so that trading on those instruments with other requests can continue; furthermore, the leg which is not executable should become the primary. We describe this as "inversion" for a two leg trade. In the general case, it is a change making the leg the one which continues to be actively matched.

There is a new hardening principle: the logging service should report as its high water mark of trades durably logged the furthest point in its log such that:

All trades up through this point in the sequence for this instrument/log have been durably recorded;

And all multileg trades up through this point have been durably recorded in logs associated with different legs of the trade;

All trades logged in this book log and all multileg trades logged in their partner logs have been durably recorded;

This principle ensures that, in the event of an exchange failure, all multileg and single leg executed trades can be reconstructed by a separate forward pass through the separate logs on the independent log servers. There is no ambiguity about partially logged multileg trades. Any trade reported as logged is logged in all the necessary instrument durable logs.

In the event of an execution venue (EV) failure, the exact sequence of executed trades must be replicated identically on a replacement or takeover book processor at least up through:

The last reported hardened trade (which may have been released back to a requester);

The last multileg trade which may have affected processing at other book venues;

This level of exact recovery of the sequence of supported requests possibly through the request immediately preceding the failure is easily achievable in a peer coupled system or through cross logging operations in a primary—secondary failover scheme.

Now we want to execute "all or nothing two leg trades" against the full liquidity on single leg books with minimal latency loss, assured logged execution, etc.

The objective is to provide maximally scalable, minimal latency handling of both single leg and multileg trades, with multileg trades being disadvantaged with respect to single leg trades when this is necessary to minimize the disruption of single leg only traffic.

This is not a well posed problem for exchange recovery schemes based on total request preordering scheme, which by definition requires the run behind delay of the slowest book to be propagated to any other books connected to it via chains of multileg trades.

Hence the multileg design presented here presumes and is based on a partially ordered reliable recovery scheme for single leg trading which handles all single leg requests in the order in which they are received. This could be a system using primary-secondary pairs or a peer coupled system using a Coupling Facility (CF) to provide coordinated ordering of trades across peer matching venues.

We first outline here how to implement a processing and recovery algorithm assuming high performance low latency messaging between nodes but no Coupling Facility (CF). The following section will show how we can improve the algorithm exploiting the synchronizing reliable coupling facility.

It is to be appreciated that we present the multileg processing and recovery algorithm as a set of deltas on the partially ordered primary-secondary availability scheme.

An overview of the major steps in processing multileg trades is shown in FIGS. 7A and 7B. FIGS. 8 through 13 show graphically the states in a two leg trade example at each major intermediate point.

We illustrate and discuss multileg-trades with examples which are two leg trades. The same principles apply to multileg trades with orders greater than two.

Gateways (GWs) are where trades arrive from customers and enter the trading system. Gateway processing of a multileg trade differs from the processing of a single leg trade in that it is submitted for Multileg Processing (MLP). This additional processing may be collocated with the gateway where the multileg trade request arrived or could be located in a separate node in the scalable trading system.

The multileg trade processing algorithm breaks up the multileg trade requests into separate requests which can be routed independently to each venue trading its leg. Furthermore, an initial "order of processing" of the legs is selected. For a two leg trade this involves an ALeg intended to be initially matched first, and a BLeg matched second.

The heuristic used in ordering the legs of a multileg trade is that legs less likely to execute immediately are matched before legs more likely to execute immediately. This heuristic decision will not affect the outcome of the multileg trade but can improve the efficiency with which multileg trades are matched. Recent market price and market liquidity history is used as the basis for the heuristic order assignment. There is no requirement for the ordering to be based on exact or current information.

The multileg processing publishes the separate requests for each leg to the topic which will deliver the leg request to all venues (primary secondary or peer) performing market matching for the target of that leg. The leg request messages include:
- A sequencing field showing where this leg request sits on the stream of requests from this gateway to this matching venue.
- The details of this leg trade (symbol to be traded, price bounds, amount to be traded, buy/sell, etc.)
- Cross referencing information identifying the other legs of the multileg trade.

Figure 8:
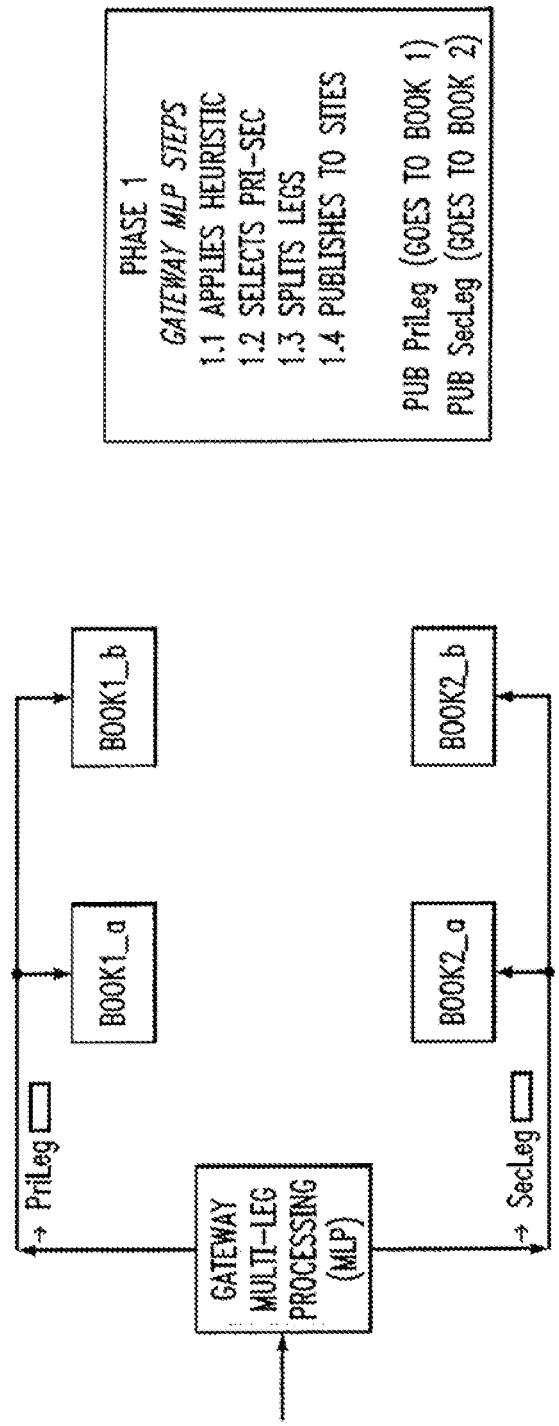

The effects of this are illustrated in FIG. 8.

When the leg requests arrive at the market matching venues, they are enqueued along with the single trades in the stream of requests arriving at that venue from all gateways. In this way, we ensure that no multileg trade unfairly "overtakes" a single leg request because one of its legs has a short queue. This stage is illustrated in FIG. 9 with the unmatched PriLeg and SecLeg single leg request making progress through the request queues at peer market matching nodes, Book1_a, Book1_b, Book2_a and Book2_b.

The queues are managed in a primary-secondary failover market matching scheme with the primary setting the order in which requests from different gateways will be handled. In a peer scheme, the peer market matching nodes coordinate through a coupling facility to ensure each handles requests from different gateways in exactly the same order.

When the secondary leg (Secleg) request reaches the front of the request queue at the secondary node, rather than being matched it is "saved aside" in a bag. This prevents there being more than one leg of a multileg trade concurrently available in books for matching and hence suppresses possible race conditions.

When the primary leg (PriLeg) reaches the front of the queue of the primary node handling matching for its target book or, in the case of peer-peer failover schemes, is agreed to be the "next order" to be handled:
1. The book is checked to see whether a matching trade is currently available;
2. if not: the leg is left in the book available for matching with subsequent incoming requests on that book;
3. If there is a potential matching trade:
    Publish the information on this potential trade to the "next" venue on the trade sequence of this multileg;
    Wait for a response indicating whether the other legs of the trade are matched or node;
    Hold trading on this Book1 contract until this response is received—so that there is deterministic order of trades on book 1 either including or not including this multileg trade.

Figure 10:
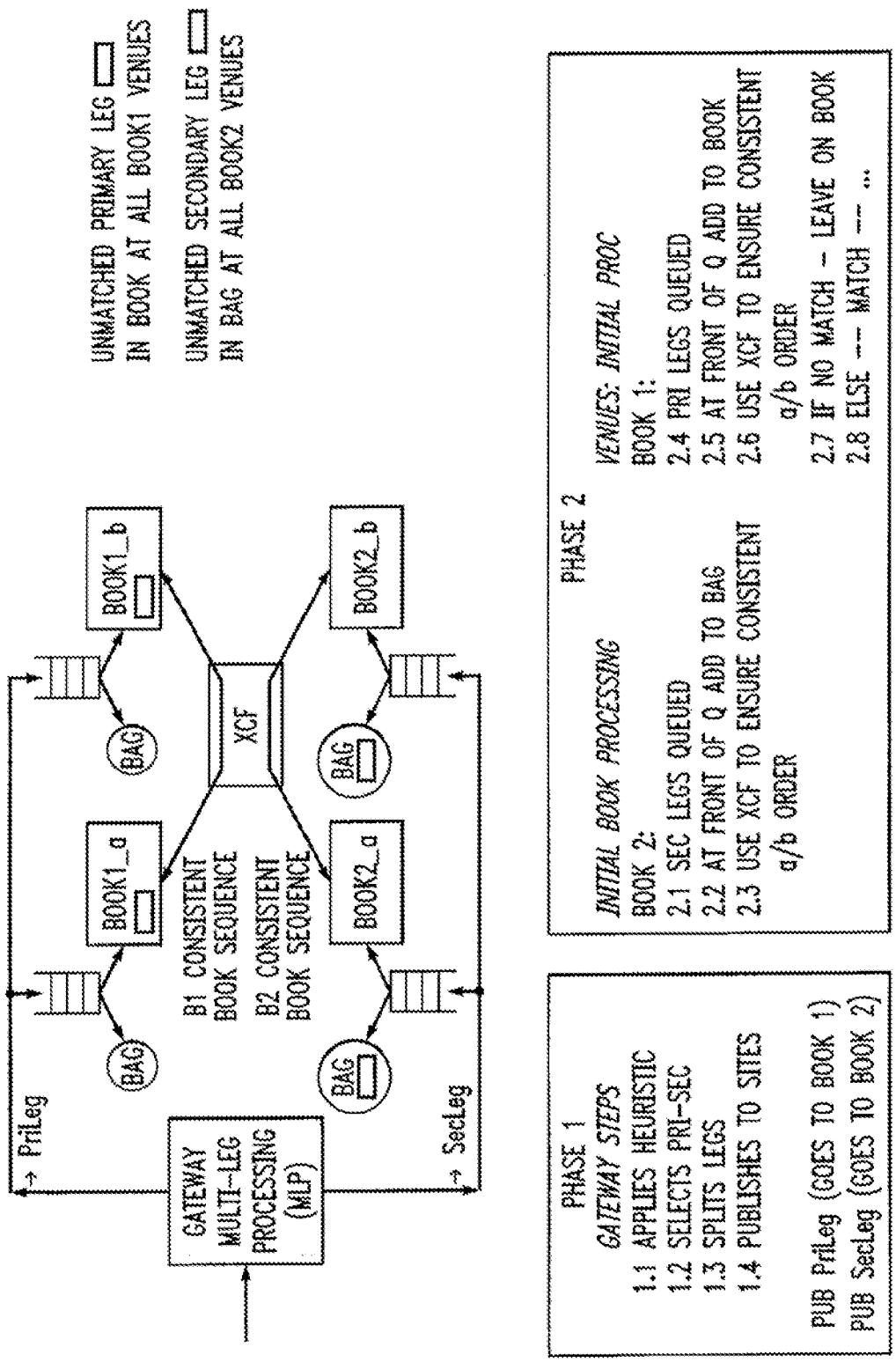

FIG. 10 shows the state (in the case of a two leg multileg trade with a peer recovery scheme at each market matching venue) for when there is no match immediately available at book 1 for the primary leg. The unmatched PriLeg requests are sitting in the books in memory in peer nodes Book1_a and Book1_b where they are available for matching with other incoming requests, both single leg and multileg. The SecLegs have reached the front of the request queues at matching nodes Book2_a, Book2_b, but have been put aside in the respective bags waiting for an indication that there is a potential match for their primary legs, rather than being made available for matching in the Book2 books in memory.

Figure 11:
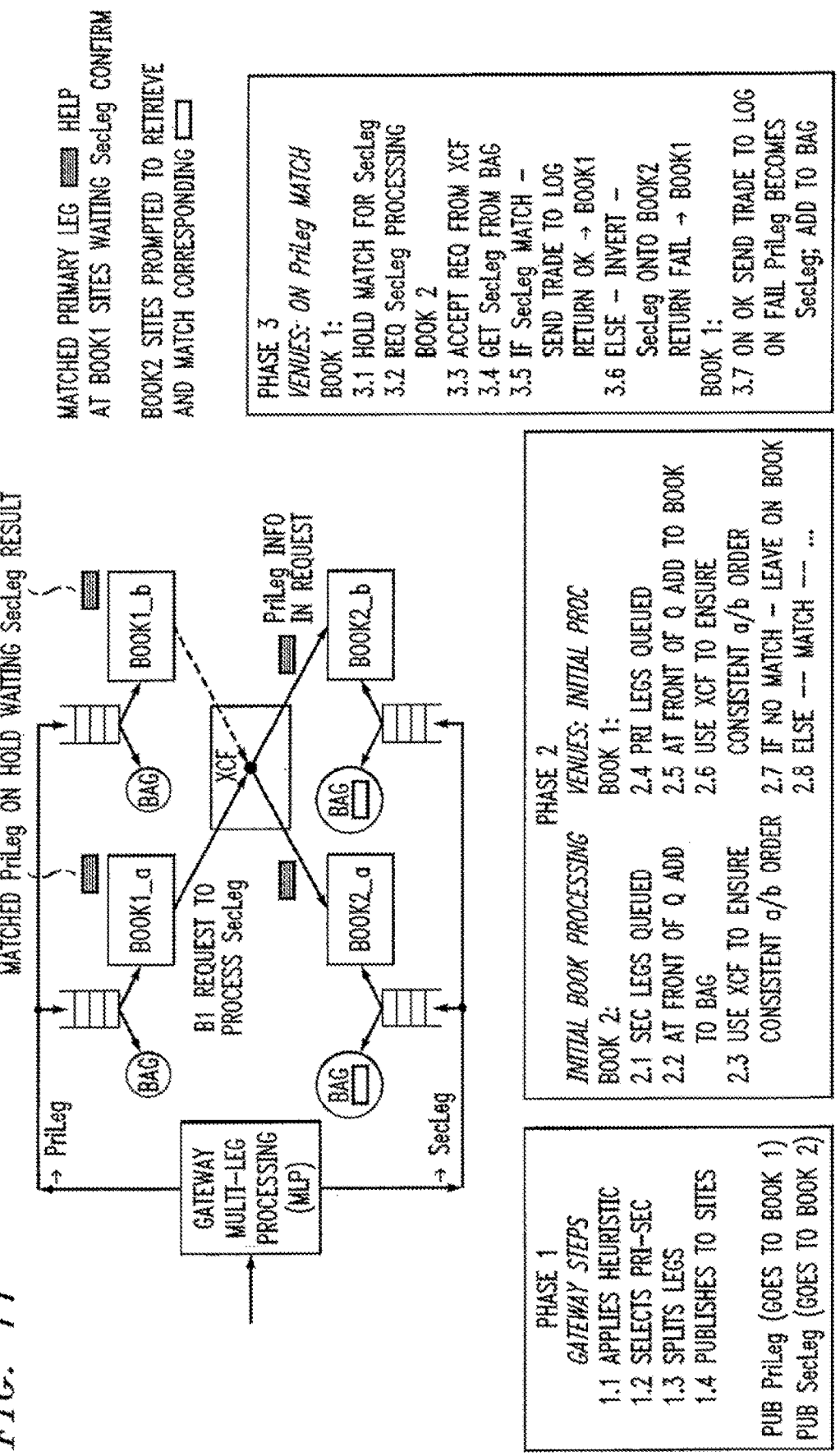

FIG. 11 shows the state where a potential match has been found for the primary legs (under all normal conditions this will occur at both peer replicas Book1_a and Book1_b since there are handling identical requests in the same order), and potential primary leg match information has been published to the nodes handling matching for the next leg. This potential primary leg match information flows to Book2_a and Book2_b.

When the potential primary leg trade information arrives at a matching node for the next leg in the leg sequence for the multileg trade:
1. This request is treated with priority and handled ahead of normal (single leg) requests in the queue;
2. The partner leg request is retrieved from the bag or request queue;
3. Matching against the in memory book for the secondary leg is performed;
4. If there is no match for the secondary leg:
    inversion occurs: this leg—previously the secondary—is now considered the primary and left on the book available for matching with subsequent arriving requests;
    notification of the inversion is published back to the primary leg nodes that the potential multileg trade has failed and that the previous primary leg should now be considered secondary;
5. If there is a match for the secondary leg (this is a two leg multileg):
    the multileg is successfully traded on both legs;
    this is reported and sent to a logging node for this book to make a hardened record;
    notification is published back to the primary nodes that the mult0leg has completed including information on the successful secondary leg.

If, at the secondary node, the secondary leg has not arrived and is not available in the bag, this is handled like a secondary match failure except that a record is left that when this secondary leg arrives—it is to be handled as a primary since the decision was to invert the multileg.

For multileg trades involving more than two legs, if the secondary matches correctly then the algorithm proceeds recursively publishing to the third leg (or subsequent leg) that potential matches for legs 1, 2, etc. have been found and performing the critical test on the next leg in the leg order.

Processing of these reports back at the primary leg nodes is as follows:
1. If an inversion report arrives—indicating that the secondary leg did not find a match:
    The previous potential match for the primary leg is discarded;

The (former) primary leg is now considered a secondary leg and moved off the book and into the bag;
This leg is no longer available in the book for matching with subsequent incoming requests.
2. if the report indicates successful secondary leg match: this multileg is considered complete and removed from the in memory book;
report of both legs is sent to the history log recording node for this book.

Figure 12:
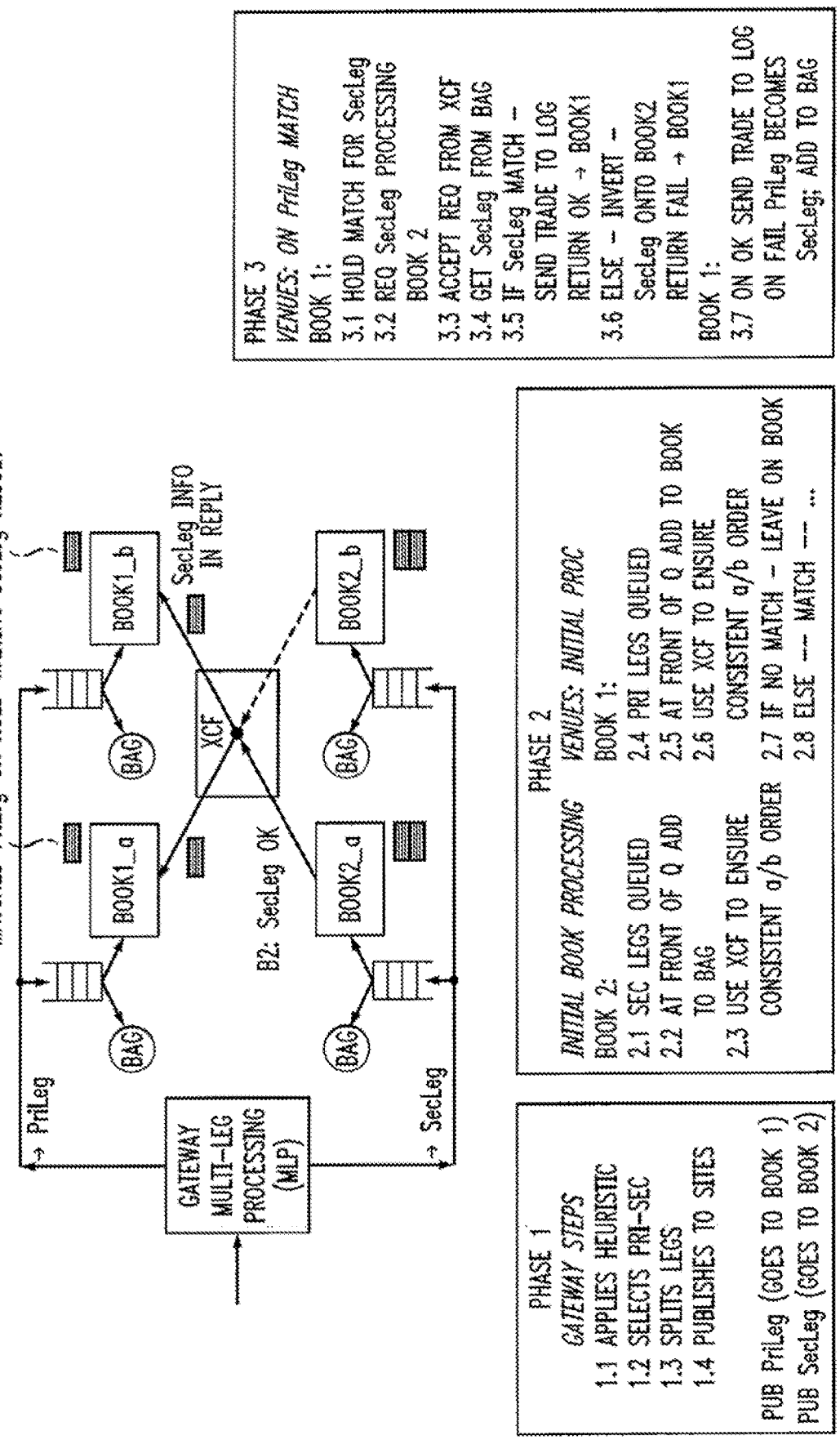

FIG. 12 illustrates the state for a two leg trade with peer recovery, after a successful match of the secondary leg. Secondary nodes Book2_a, Book2_b are now aware of both successful leg matches and are reporting that to their history logs. Notification of successful secondary leg match is being published back to nodes Book1_a, Book1_b who are waiting for this notification and previously knew the potential leg1 match.

Figure 13:
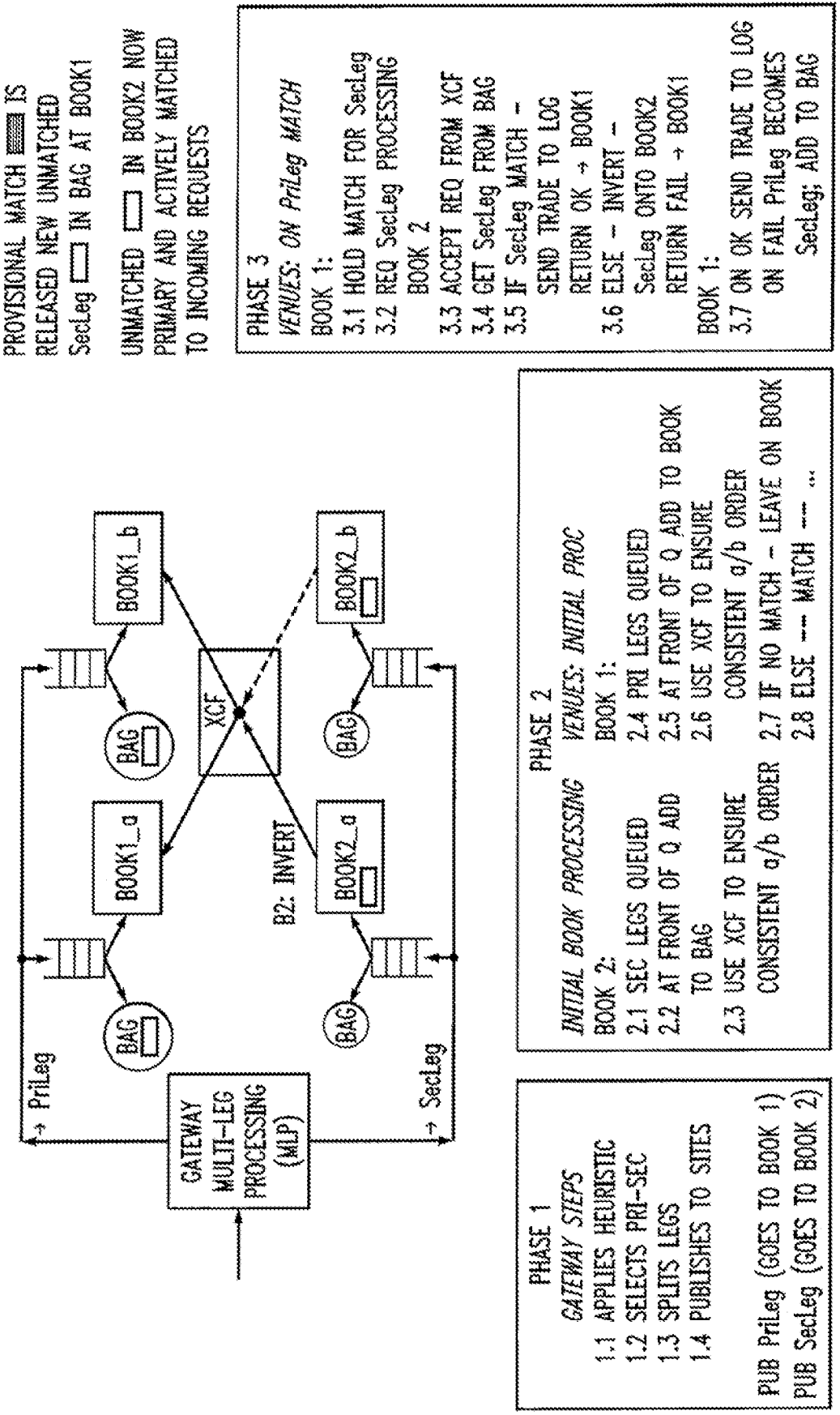

FIG. 13 illustrates the state after reporting an unsuccessful secondary leg match back to the primary nodes. Inversion of the leg order has occurred. At the (former) primary leg nodes Book1_a, Book1_b, the previous potential legA match has been discarded. The legA requests have been demoted to the bags at nodes Book1_a, Book2_a. Further, multileg matching can only be initiated by matching on the Book2 leg. At nodes Book2_a, Book2_b, the unmatched LegB request is sitting in the book in memory, available for matching by subsequent incoming single leg and multileg requests.

A critical requirement in single leg trading is that no trade completion message goes back to the request issuing gateway until the log in some durable history recorder for the book where the trade has been matched has progressed to a point at which that executed trade is known to be on disk and hence completely recoverable. Hence, there is a list of processed but not confirmed trades sitting at the primary waiting to be confirmed back to their gateways when an appropriate history persisted (HP) report is received.

For a multileg trade involving book1 and book2, we need a corresponding degree of assurance—namely that:
The logger persisting book1 has got beyond the book1 leg
And before the persisting book 2 has got beyond the book2 leg
Before any execution confirmations go back to a gateway.
This is a sufficient condition because neither book will fail back and undo trades which have been persisted and potentially reported back to clients. So if each book has hardened beyond its leg, neither leg of the trade is at risk and the entire trade can be reported.

The simplest way of ensuring this is to impose on history recorders (e.g., HR in FIG. 1B) the following responsibility:
History recorders write out arriving streams of single leg and multileg orders as fast as they arrive and test for progress of unbroken complete sequences on to the disk.
They report progress in logging history using reports with a pair of values:
<maximal disk progress, confirmed progress>
Maximal disk progress=x1 for a logger recording book1 means that:
All trades involving book1 preceding and up to x1 have been durable recorded in this log.
Confirmed progress=x2 for a logger recording book1 means:
All trades involving book1 preceding and up to x2 have been durable recorded in this log;
AND
All multileg trades involving book1 preceding and up to x2 have been durably recorded in the logs for the other books involved.

Maximal disk progress is an indicator published and shared between history recorders to help them advance their own confirmed progress. Confirmed progress is an indicator published by history recorders for their associated trade matching nodes which indicates when a trade can be considered durably logged and hence reported back to the originating client gateway.

As an illustration of these concepts:
If history recorder node H1 has written trades {x1, x2, (x3,y3), x4, x5} to its log, where (x3,y3) is a two leg trade, it reports:
disk progress=x5
confirmed progress=x2
because x2 is the last trade known to be recorded not involving a multileg which may not be durable yet.
We note that confirmed progress<=disk progress at all times.
When H1 subsequently:
has written say {x1, x2, (x3,y3), x4, x5, x6, x7 x8}
AND has seen an H2 report with disk progress>=(x3,y3)
It can report confirmed progress=disk progress=x8 back to Book1

Book1 will handle confirmed progress reports and release completion notices exactly as it handled disk progress reports from history recorder previously. No trades in a book following a multileg will be reported back to the requesting gateway until both legs of all preceding multilegs are written into the appropriate book logs and the additional single legs trades on this book up to this one have all made it to disk.

At this point, the leg1 primary is in a position to report completion of the multileg to the requesting gateway. The leg2 primary can assume that the completion has been sent and move on to confirming following (single or other multileg trades on its book).

One refinement is needed to handle history recorder failover. The history recorder must have a valid list of unconfirmed multileg trades which it is watching for disk progress reports from other history recorders on to step forward. The history recorder can always get this list after a failover by reading its log, but a question to be determined is how far back must it go. To address this question, each history recorder may keep a "no unconfirmed multilegs beyond" indicator and periodically checkpoint these into the log. Then, when reading the log in history failover (backwards), the history recorder can stop at the first of these.

Figure 14:
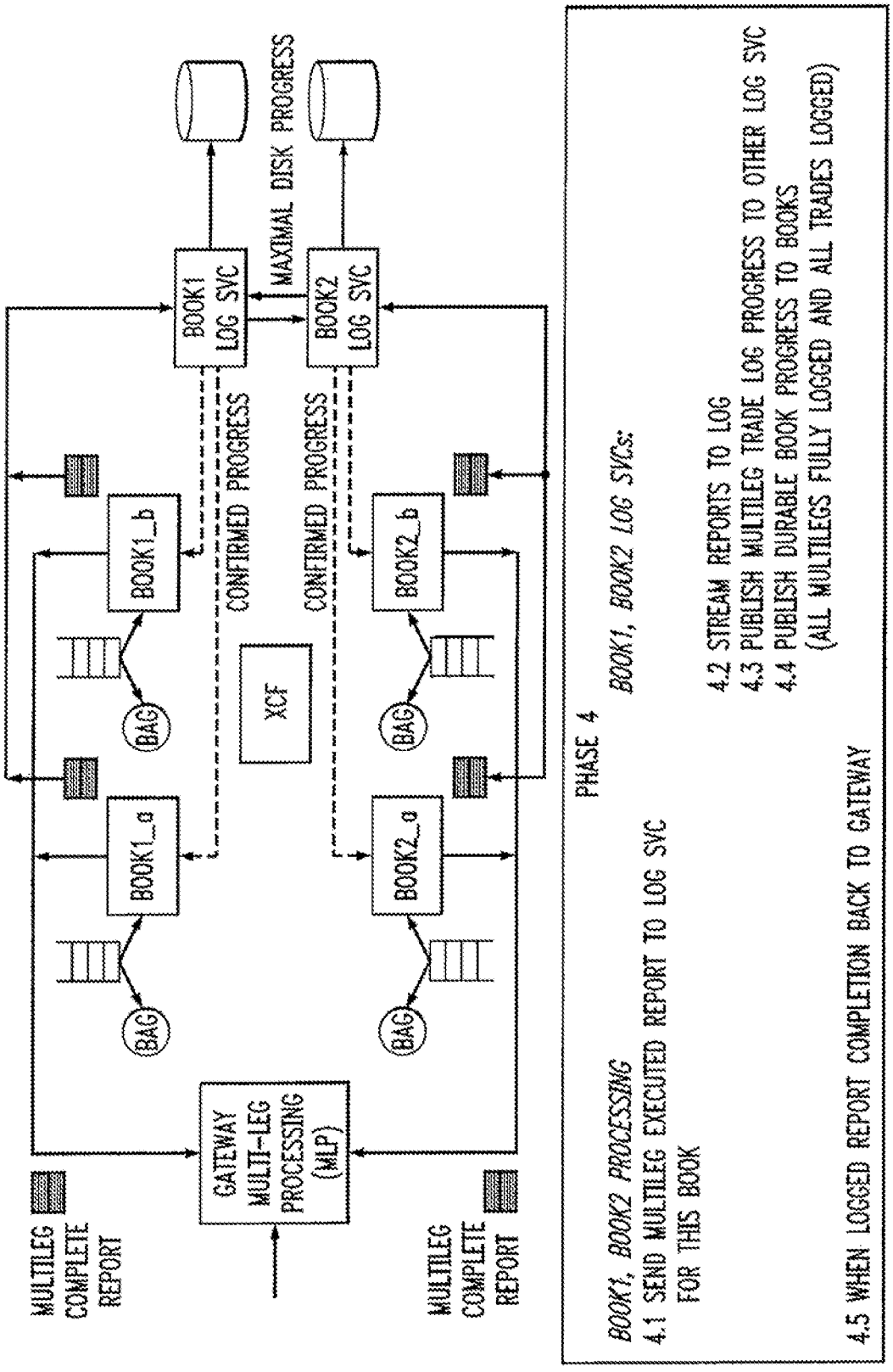

FIG. 14 shows graphically the relationship of history hardening for the example two leg trade of the previous figures.

We now explain the problems associated with replay in multileg recovery. The question here is what happens when a trade matching node fails and multileg trades are being supporting introducing trader ordering dependencies between books.

In single leg trade only recovery using a primary-secondary failover scheme, the basic algorithm on a matching node failure is as follows:
1. The secondary node retrieves from the history log the exact sequence of trades up to end of log from history recorder;
2. The secondary node removes from its input queue of waiting trade requests, all requests corresponding to trades which have already been handles at the primary checking that these trades are properly reflected in its in-memory version of the book;
3. The secondary then proceeds, now as the new primary node, picking an order to process trades based the order in which requests arrived in its queue.

The problem with this scheme in the presence of multileg trades is that if book1 processes trades {x1, x2, (x3,y3), x4} but then fails before x1 is persisted, book1 secondary with the basic single leg trade rules may see the arrival order as {x1, x4 (x3,y3), x2}. But, if it proceeds to execute this unilaterally, the results of the mutileg (x3,y3) are now invalid. If that gets re-executed as (x3',y3') or not executed at all, book 2 will have to replay its market progress from the (x3'y3') point.

This is possible in principle (since nothing has been confirmed back to gateways using the logic of the preceding section)—but is a huge risk in terms of being able to keep up with the stream of arriving requests in real time.

The principle for avoiding replay in the presence of multileg trades is that in the event of a primary failover, the secondary taking over book1 recaptures the exact ordering of all trades persisted into the book1 log. In addition, for a multileg environment, if there are multileg trades on which book1 interacted with other books before it crashed, then the secondary taking over book1 must recreate the sequence of orders previously processed by the book1 primary through subsequent multileg trades. The secondary taking over book1 is free to reorder the tail of single leg only trades beyond the primaries history log and beyond the last multileg.

If the previous primary ordering of all multileg trades is recreated, then these can be repeated by the secondary taking over the book. The ongoing processing at other books related through multileg trades is now valid. There is no risk of having to modify trades previously seen as handled at other books.

We describe first an implementation of this which uses cross-logging. We shall see subsequently that this can be significantly simplified by use of a reliable synchronous Coupling Facility (CF) environment.

Figure 15:
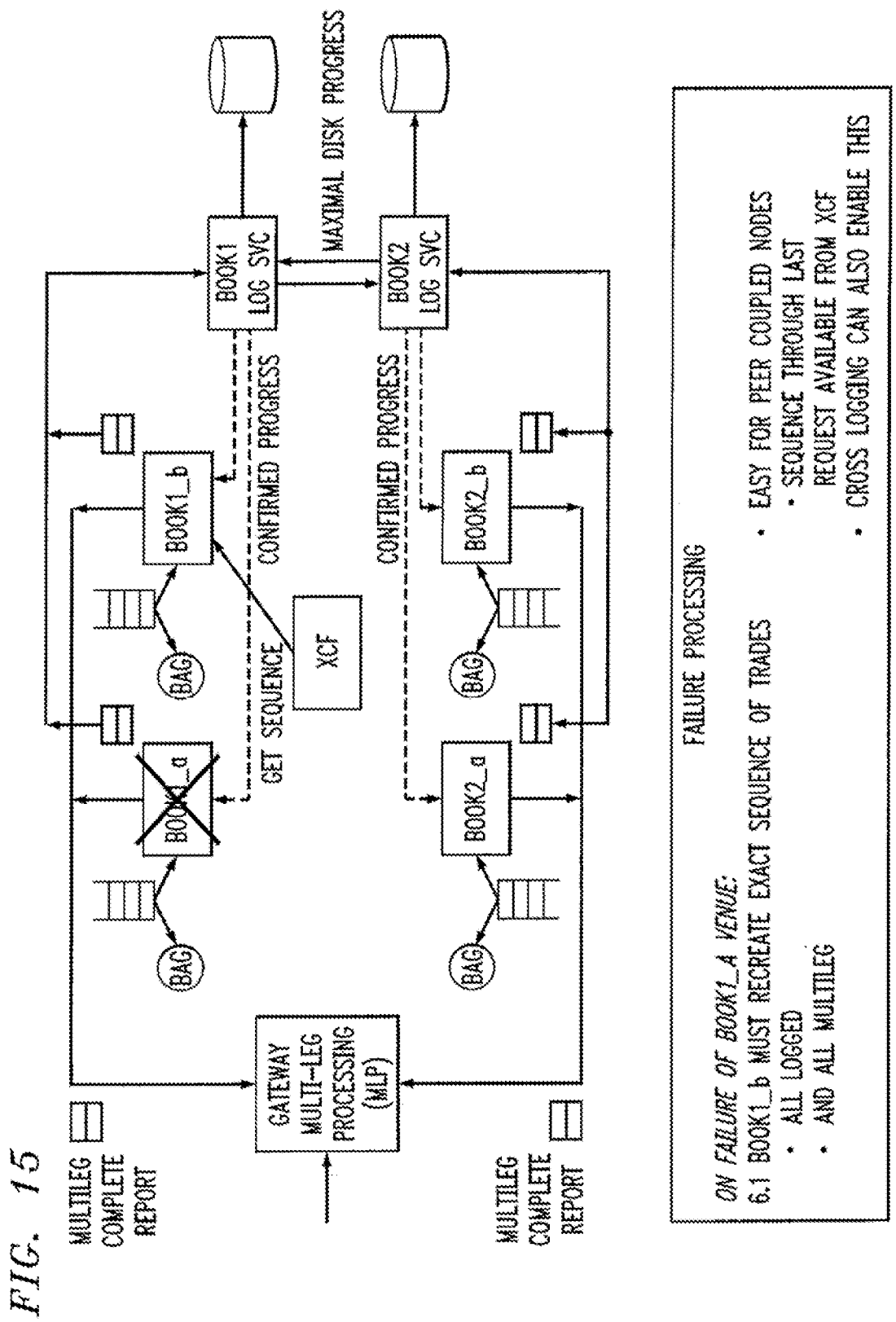

This replay requirement is illustrated graphically in FIG. 15 in the context of the two-leg trade example discussed in earlier figures.

Essentially the scheme is that when the primaries for book1 and book2 interact on multileg trades involving book1 and book 2, they exchange in their messages the current sequence of previously processed requests from the current back through the persistence progress point on each book. This sequence cross-logging will be included in the history record which each book primary sends to its history recorder.

Now suppose the book1 primary fails after processing a sequence:

x1, x2, (x3,y3), (x4,z4),(x5,w5),x6,x7 none of which have made it to its log, where y3 was on Book2, z4 on book3, w5 on book5.

Also suppose that (x4,z4) is available either from a live primary handling book3 or from the persisted book3 log but, for any subsequent multilegs, the primary on the partner book failed without persisting them. Then, the ordering sequence {x1, x2, (x3,y3), (x4,z4)} is recoverable. The secondary taking over book1 is required to replay this exact sequence. Since there is no available record of any subsequent multileg in any log or book, that is effectively lost and may or may not be recreated on replay—as would have been true for single leg trades in the tail beyond the log in single leg trade recovery today.

Advantageously, the cross-logging scheme described above reduces replay to the tail of transactions which are beyond the recoverable sequencing from any log or memory record of any book processing the complex. That is an acceptable replay burden requiring no more cross node coordination than the original replay of tail single leg transactions.

All of the above algorithms presume extremely fast reliable low latency communication for which exploitation of CF Sysplex Hypersockets is natural.

Assumption:
  CF (list server) provides a facility
  Sharable among all book processing nodes
  Allowing synchronous data interaction with millisecond response time 100,000 s interactions per second
  Stability/recoverability of written information may be equivalent to that on disk So now have each primary book processing node write its request sequencing into CF synchronously after processing them against the book and before it request persisting of the trade results by the history recorder. On multileg trades, LegA say book1 writes an "in doubt" before interacting with LegB at book2. Book2 processes its leg and writes a definitive Yes/no+results into CF before messaging back to book1. On a primary failover, the primary can now replay the information in the CF which is guaranteed to repeat correctly all trades through the last one.

If the last trade is single leg, that can be ignored— secondary is free to replace it with an alternate ordering. In the last trade for this (failed book) is a multileg and this book-book1 was the A Leg—then the Bleg will have written a record into the coupling facility before sending back the confirmation to this node. If that can be retrieved from the coupling facility, then book2 has proceeded including this trade; the secondary taking over book1 is required to replay it as recorded in the CF. If there is no book2 record of the multileg trade in the CF, then neither book has a stable record of this trade. Either it did not reach book2 or book2 failed before executing it and writing a persistent record. The secondary taking over book1 is free to attempt the trade again and can accept success or failure as the result, or on the basis of its received order, execute some different trade.

Basically use of the CF substantially simplifies the retrieval of information from multiple logs by writing the critical replay sequencing information into a stable sharable place. Also, cross-logging may be chosen for disk based recovery as well as using the CF.

If there are concerns about the stability of CF held information on trades relative to dual disk logging of trades, one embodiment is to choose to have the cross-logging information there for additional (disaster) disk-based recovery.

Figure 16:
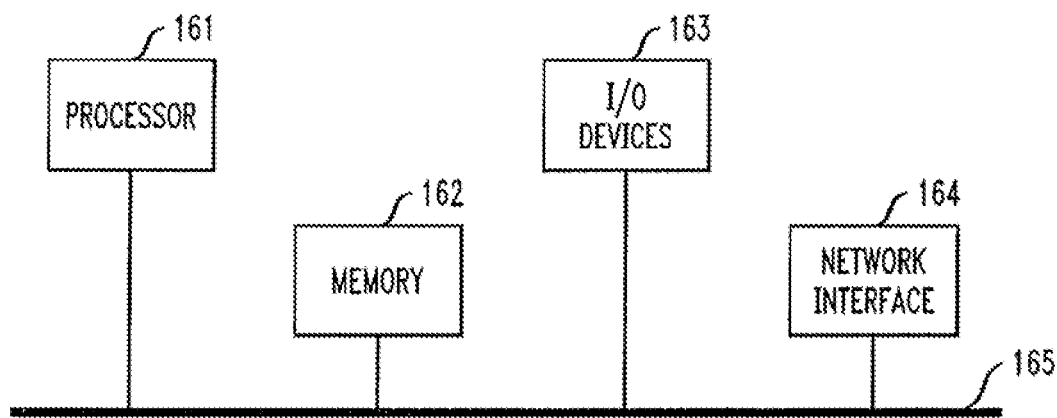
FIG. 16 shows a computer system wherein coordinated transaction processing techniques may be implemented in accordance with one embodiment of the invention.

Referring lastly to FIG. 16, a computer system is illustrated wherein techniques for transaction processing may be implemented according to an embodiment of the invention. That is, FIG. 16 illustrates a computer system in accordance with which one or more components/steps of the transaction processing techniques (e.g., components and methodologies described above in the context of FIGS. 1A through 15) may be implemented, according to an embodiment of the invention. It is to be understood that the individual components/steps may be implemented on one such computer system or on more than one such computer system. In the case of an implementation on a distributed computing system, the individual computer systems and/or devices may be connected via a suitable network, e.g., the Internet or World Wide Web. However, the system may be realized via private or local networks. In any case, the invention is not limited to any particular network.

Thus, the computer system shown in FIG. 16 may represent one or more servers or one or more other processing devices capable of providing all or portions of the functions described herein. Alternatively, FIG. 16 may represent a mainframe computer system.

As shown, the computer system includes processor 161, memory 162, input/output (I/O) devices 163, and network interface 164, coupled via a computer bus 165 or alternate connection arrangement.

It is to be appreciated that the term "processor" as used herein is intended to include any processing device, such as, for example, one that includes a CPU and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. The memory may be considered a computer readable storage medium.

In addition, the phrase "input/output devices" or "I/O devices" as used herein is intended to include, for example, one or more input devices (e.g., keyboard, mouse, etc.) for entering data to the processing unit, and/or one or more output devices (e.g., display, etc.) for presenting results associated with the processing unit.

Still further, the phrase "network interface" as used herein is intended to include, for example, one or more transceivers to permit the computer system to communicate with another computer system via an appropriate communications protocol.

Accordingly, software components including instructions or code for performing the methodologies described herein may be stored in one or more of the associated memory devices (e.g., ROM, fixed or removable memory) and, when ready to be utilized, loaded in part or in whole (e.g., into RAM) and executed by a CPU.

In any case, it is to be appreciated that the techniques of the invention, described herein and shown in the appended figures, may be implemented in various forms of hardware, software, or combinations thereof, e.g., one or more operatively programmed general purpose digital computers with associated memory, implementation-specific integrated circuit(s), functional circuitry, etc. Given the techniques of the invention provided herein, one of ordinary skill in the art will be able to contemplate other implementations of the techniques of the invention.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. In an electronic trading system comprising a plurality of computing nodes including at least one gateway processing node for receiving requests and a plurality of execution venue nodes for executing trades, a method for handling multileg requests, the method comprising:

receiving, by the at least one gateway processing node, a multileg request for executing a trade transaction, wherein the multileg request comprises a plurality of legs, wherein each leg of the multileg request comprises a request to execute a different trade transaction;

determining, by at least one computing node of the plurality of computing nodes performing a computational analysis, which leg among the plurality of legs of the multileg request is less likely to execute immediately;

designating as a primary leg, by the least one computing node of the plurality of computing nodes, the leg which is determined less likely to execute immediately;

designating, by the at least one computing node of the plurality of computing nodes, each leg of the multileg request, other than the primary leg, as a secondary leg;

in response to the designating of the primary leg and the secondary legs;

placing the primary leg and the secondary legs in associated request queues of associated execution venue nodes which handle the trade transactions associated with the primary and secondary legs;

in response to a secondary leg of the multileg request reaching a front of the associated request queue prior to the primary leg reaching a front of the associated request queue, setting aside the secondary leg and not placing the secondary leg in an order book for attempting to match the secondary leg to a pending trade transaction;

in response to the primary leg reaching the front of the associated request queue, attempting to match the primary leg to a pending trade transaction in an order book; and in response to finding a match between the primary leg and a pending trade transaction;

attempting to match each of the secondary legs to pending trade transactions; and executing the primary leg and each of the secondary legs of the multileg request in response to each of the secondary legs having been matched to pending trade transactions, wherein attempting to match each of the secondary legs to pending trade transactions comprises:

attempting to match a given secondary leg of the multileg request to a pending trade transaction;

in response to finding a match between the given secondary leg and a pending trade transaction, reporting the match of the given secondary leg to an execution venue node handling the execution of the primary leg of the multileg request; and in response to not finding a match between the given secondary leg and a pending trade transaction:

reporting the non-matching between the given secondary leg and a pending trade transaction to the execution venue node handling the execution of the primary leg of the multileg request;

discarding the found match between the primary leg and the pending trade transaction;

designating the primary leg as a new secondary leg and setting aside the new secondary leg;

designating the given secondary leg as a new primary leg; and maintaining the new primary leg on an order book for subsequent matching to a pending trade transaction.

2. The method of claim 1, wherein in response to not finding a match between the primary leg and a pending trade transaction in the order book, maintaining the primary leg in the order book for a subsequent attempt at matching the primary leg to a pending trade transaction.

3. The method of claim 1, further comprising delaying a reporting of completion of the multileg request until each leg of the multileg request has been matched to a pending trade transaction and each of the matches have been persistently stored at the associated execution venue nodes handling the execution of the legs of the multileg request.

4. The method of claim 1, further comprising utilizing a hardened communication mechanism to ensure that each of the associated execution venue nodes handling the execution of the legs of the multileg request can determine and maintain a proper order of execution handling of the legs of the multileg request.

5. The method of claim 1, wherein the computational analysis comprises a heuristic analysis which is performed based, at least in part, on information comprising recent market price information and historical market liquidity information.

6. An article of manufacture comprising a non-transitory computer readable storage medium that stores one or more computer programs which, when executed by a computer, implements a method for handling multileg requests in an electronic trading system comprising a plurality of computing nodes including at least one gateway processing node for receiving requests and a plurality of execution venue nodes for executing trades, the method comprising:
receiving, by the at least one gateway processing node, a multileg request for executing a trade transaction, wherein the multileg request comprises a plurality of legs, wherein each leg of the multileg request comprises a request to execute a different trade transaction;
determining, by at least one computing node of the plurality of computing nodes performing a computational analysis, which leg among the plurality of legs of the multileg request is less likely to execute immediately;
designating as a primary leg, by the least one computing node of the plurality of computing nodes, the leg which is determined less likely to execute immediately;
designating, by the at least one computing node of the plurality of computing nodes, each leg of the multileg request, other than the primary leg, as a secondary leg;
in response to the designating of the primary leg and the secondary legs;
placing the primary leg and the secondary legs in associated request queues of associated execution venue nodes which handle the trade transactions associated with the primary and secondary legs;
in response to a secondary leg of the multileg request reaching a front of the associated request queue prior to the primary leg reaching a front of the associated request queue, setting aside the secondary leg and not placing the secondary leg in an order book for attempting to match the secondary leg to a pending trade transaction;
in response to the primary leg reaching the front of the associated request queue, attempting to match the primary leg to a pending trade transaction in an order book; and
in response to finding a match between the primary leg and a pending trade transaction;
attempting to match each of the secondary legs to pending trade transactions; and
executing the primary leg and each of the secondary legs of the multileg request in response to each of the secondary legs having been matched to pending trade transactions;
wherein attempting to match each of the secondary legs to pending trade transactions comprises:
attempting to match a given secondary leg of the multileg request to a pending trade transaction;
in response to finding a match between the given secondary leg and a pending trade transaction, reporting the match of the given secondary leg to an execution venue node handling the execution of the primary leg of the multileg request; and
in response to not finding a match between the given secondary leg and a pending trade transaction:
reporting the non-matching between the given secondary leg and a pending trade transaction to the execution venue node handling the execution of the primary leg of the multileg request;
discarding the found match between the primary leg and the pending trade transaction;
designating the primary leg as a new secondary leg and setting aside the new secondary leg;
designating the given secondary leg as a new primary leg; and
maintaining the new primary leg on an order book for subsequent matching to a pending trade transaction.

7. The article of manufacture of claim 6, wherein in response to not finding a match between the primary leg and a pending trade transaction in the order book, maintaining the primary leg in the order book for a subsequent attempt at matching the primary leg to a pending trade transaction.

8. The article of manufacture of claim 6, further comprising delaying a reporting of completion of the multileg request until each leg of the multileg request has been matched to a pending trade transaction and each of the matches have been persistently stored at the associated execution venue nodes handling the execution of the legs of the multileg request.

9. The article of manufacture of claim 6, further comprising utilizing a hardened communication mechanism to ensure that each of the associated execution venue nodes handling the execution of the legs of the multileg request can determine and maintain a proper order of execution handling of the legs of the multileg request.

10. The article of manufacture of claim 6, wherein the computational analysis comprises a heuristic analysis which is performed based, at least in part, on information comprising recent market price information and historical market liquidity information.

11. An electronic trading system, comprising:
a plurality of computing nodes including at least one gateway processing node for receiving requests and a plurality of execution venue nodes for executing trades, each computing node comprising memory that is configured to store program code and processors that are configured to execute the stored program code to implement an automated process for handling multileg requests, wherein the automated process comprises:
receiving, by the at least one gateway processing node, a multileg request for executing a trade transaction, wherein the multileg request comprises a plurality of legs, wherein each leg of the multileg request comprises a request to execute a different trade transaction;
determining, by at least one computing node of the plurality of computing nodes performing a computational analysis, which leg among the plurality of legs of the multileg request is less likely to execute immediately;

designating as a primary leg, by the least one computing node of the plurality of computing nodes, the leg which is determined less likely to execute immediately;

designating, by the at least one computing node of the plurality of computing nodes, each leg of the multileg request, other than the primary leg, as a secondary leg;

in response to the designating of the primary leg and the secondary legs;

placing the primary leg and the secondary legs in associated request queues of associated execution venue nodes which handle the trade transactions associated with the primary and secondary legs;

in response to a secondary leg of the multileg request reaching a front of the associated request queue prior to the primary leg reaching a front of the associated request queue, setting aside the secondary leg and not placing the secondary leg in an order book for attempting to match the secondary leg to a pending trade transaction;

in response to the primary leg reaching the front of the associated request queue, attempting to match the primary leg to a pending trade transaction in an order book; and in response to finding a match between the primary leg and a pending trade transaction;

attempting to match each of the secondary legs to pending trade transactions; and executing the primary leg and each of the secondary legs of the multileg request in response to each of the secondary legs having been matched to pending trade transactions;

wherein attempting to match each of the secondary legs to pending trade transactions comprises:

attempting to match a given secondary leg of the multileg request to a pending trade transaction;

in response to finding a match between the given secondary leg and a pending trade transaction, reporting the match of the given secondary leg to an execution venue node handling the execution of the primary leg of the multileg request; and in response to not finding a match between the given secondary leg and a pending trade transaction:

reporting the non-matching between the given secondary leg and a pending trade transaction to the execution venue node handling the execution of the primary leg of the multileg request;

discarding the found match between the primary leg and the pending trade transaction;

designating the primary leg as a new secondary leg and setting aside the new secondary leg;

designating the given secondary leg as a new primary leg; and maintaining the new primary leg on an order book for subsequent matching to a pending trade transaction.

12. The system of claim 11, wherein the process further comprises, in response to not finding a match between the primary leg and a pending trade transaction in the order book, maintaining the primary leg in the order book for a subsequent attempt at matching the primary leg to a pending trade transaction.

13. The system of claim 11, wherein the process further comprises utilizing a hardened communication mechanism to ensure that each of the associated execution venue nodes handling the execution of the legs of the multileg request can determine and maintain a proper order of execution handling of the legs of the multileg request.

14. The system of claim 11, wherein the computational analysis comprises a heuristic analysis which is performed based, at least in part, on information comprising recent market price information and historical market liquidity information.

* * * * *